United States Patent [19]
Shimada et al.

[11] Patent Number: 5,736,095
[45] Date of Patent: Apr. 7, 1998

[54] METHOD OF PRODUCING CERAMIC HEATER FOR OXYGEN SENSOR

[75] Inventors: Takeo Shimada, Atsugi; Kiyoshi Matsushita, Osaka, both of Japan

[73] Assignees: Unisia Jecs Corporation, Atsugi; Miyagawa Kasei Industry Co., Ltd., Osaka, both of Japan

[21] Appl. No.: 426,121

[22] Filed: Apr. 20, 1995

[30] Foreign Application Priority Data

Apr. 20, 1994 [JP] Japan .................. 6-104486

[51] Int. Cl.$^6$ ............................... C04B 33/32
[52] U.S. Cl. .............. 264/614; 264/616; 264/619; 264/642; 264/643; 264/656; 264/663; 264/676; 427/269; 427/314; 427/376.2; 427/376.3; 427/380; 427/397.7
[58] Field of Search .................. 264/59, 61, 62, 264/65, 63, 66, 614, 616, 619, 643, 656, 642, 663, 676; 427/269, 314, 376.2, 376.3, 380, 397.7

[56] References Cited

U.S. PATENT DOCUMENTS

| | | | |
|---|---|---|---|
| 4,035,613 | 7/1977 | Sagawa et al. | 219/552 |
| 5,264,681 | 11/1993 | Nozaki et al. | 219/544 |
| 5,630,969 | 5/1997 | Shimada | 264/642 |

FOREIGN PATENT DOCUMENTS

| | | |
|---|---|---|
| 42 04 288 | 8/1992 | Germany . |
| 44 01 793 | 8/1994 | Germany . |
| 63-146381 | 6/1988 | Japan . |
| 6-235716 | 8/1994 | Japan . |

OTHER PUBLICATIONS

Doerre et al., "Alumina, Processing, Properties, and Applications", Springer–Verlag, (1984).

*Primary Examiner*—Timothy Speer
*Attorney, Agent, or Firm*—Foley & Lardner

[57] ABSTRACT

In order to produce a ceramic heater for an oxygen sensor, a method is used, which comprises the steps of: (a) molding a green cylindrical object from a ceramic material which contains a binder; (b) provisionally baking the green cylindrical object at a relatively lower temperature thereby to produce an insufficiently baked cylindrical object, the lower temperature being sufficient for removing the binder from the cylindrical object; (c) printing a heater pattern on a cylindrical surface of the insufficiently baked cylindrical object, the heater pattern being constructed of an electrically conductive material; (d) coating the printed cylindrical surface of the insufficiently baked cylindrical object with a green protection layer thereby to produce a layer-coated cylindrical object; and (e) baking said layer-coated cylindrical object at a relatively higher temperature sufficient for baking the insufficiently baked cylindrical object, the heater pattern and the green protection layer.

11 Claims, 6 Drawing Sheets

(EXTENSION MOLDING)

(INJECTION MOLDING)

(PROVISIONAL BAKING)

(SCREEN PRINTING)

(PROTECTION LAYER COATING)

(BAKING)

(METAL PLATING)

(EXTENSION MOLDING)

(SCREEN PRINTING)

(PROTECTION LAYER COATING)

(BAKING)

(METAL PLATING)

METHOD OF PRODUCING CERAMIC HEATER FOR OXYGEN SENSOR

BACKGROUND OF THE INVENTION

1. Field of the Invention

The present invention relates in general to methods of producing ceramic heaters, and more particularly, to methods for producing ceramic heaters of a type suitable as a heater for an oxygen sensor which detects oxygen concentration in the exhaust gas from an internal combustion engine.

2. Description of the Prior Art

In automotive internal combustion engines equipped with a turbocharger, operation of the engine is generally conducted with a richer air-fuel mixture and the exhaust gas from the engine has the temperature of about 280° C. However, in general, oxygen sensors of common type exhibit their normal performance at the temperature of about 350° C. Accordingly, the oxygen sensors used in the exhaust system of the turbocharger-mounted engines are equipped with heaters, such as ceramic heaters, for their heating. For production of such ceramic heaters, the following two methods have been widely used.

In the first method, a rod-like green object is molded, via extrusion molding, from a ceramic material such as alumina or the like, and the rod-like green object is cut into pieces of a predetermined length. Each piece is dried to be hardened to form a green heater core. Then, a green ceramic protection sheet having a heater-pattern printed thereon is put around the heater core to provide a green unit which includes the green heater core and the protection sheet of the green ceramic put around the heater core. The green unit is then baked and an electrically conductive material is plated on ginve portions of the baked unit. Then, terminal portions are provided on the unit, which connect the printed heater-pattern to the plated portions.

In the second method, similar to the first method, the rod-like green object is cut into pieces and each piece is dried to be hardened to form a heater core. Then, a heater pattern is printed on the heater core. The printed heater core is dipped in a ceramic slip, such as alumina slip or the like, and subjected to a slip casting process to provide a green unit which includes the printed heater core and a layer of the slip put on the heater pattern. The green unit is baked and an electrically conductive material is plated on exposed surfaces of the heater core. Then, terminal portions are provided on the unit, which connect the printed heater-pattern to the plated surfaces. This second method is disclosed in Japanese Patent First Provisional Publication 63-146381.

However, these two conventional methods have required not only troublesome production steps but also very severe production conditions, especially, conditions on temperature and humidity.

In view of these drawbacks, the same applicants have proposed a third method by Japanese Patent Application No. 5-40573.

In this third method, a rod-like green object (heater core) is molded, via injection molding, from a ceramic material. Then, having the heater core kept turned, a heater pattern is printed on the heater core and a thicker protection layer is coated on the printed heater pattern to provide a green unit which includes the heater pattern-printed heater core and the thicker protection layer coated on the heater core. Then, the green unit is baked.

Because of usage of the injection molding technique for production of the rod-like green object, it has become easy to produce a green heater core which has a hardness suitable for the subsequent printing thereon. In fact, the heater pattern and the protection layer can be easily printed and coated on the rotating heater core.

However, even this third method has failed to provide the users with fully satisfied products. That is, due to inevitable gas generation during the baking process, it tends to occur that the protection layer is formed with undesired pin holes. Furthermore, for application of the thicker protection layer to the heater core, it is necessary to repeat the layer coating process at least three times on the same area of the heater core, which lowers the productivity.

SUMMARY OF THE INVENTION

It is therefore an object of the present invention to provide a method of producing a ceramic heater, which method is free of the above-mentioned drawbacks.

According to the present invention, there is provided a method for producing a ceramic heater. The method comprises the steps of (a) molding a green cylindrical object from a ceramic material which contains a binder; (b) provisionally baking the green cylindrical object at a relatively lower temperature thereby to produce an insufficiently baked cylindrical object, the lower temperature being sufficient for removing the binder from the cylindrical object; (c) printing a heater pattern on a cylindrical surface of the insufficiently baked cylindrical object, the heater pattern being constructed of an electrically conductive material; (d) coating the printed cylindrical surface of the insufficiently baked cylindrical object with a green protection layer thereby to produce a layer-coated cylindrical object; and (e) baking the layer-coated cylindrical object at a relatively higher temperature sufficient for baking the insufficiently baked cylindrical object, the heater pattern and the green protection layer.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
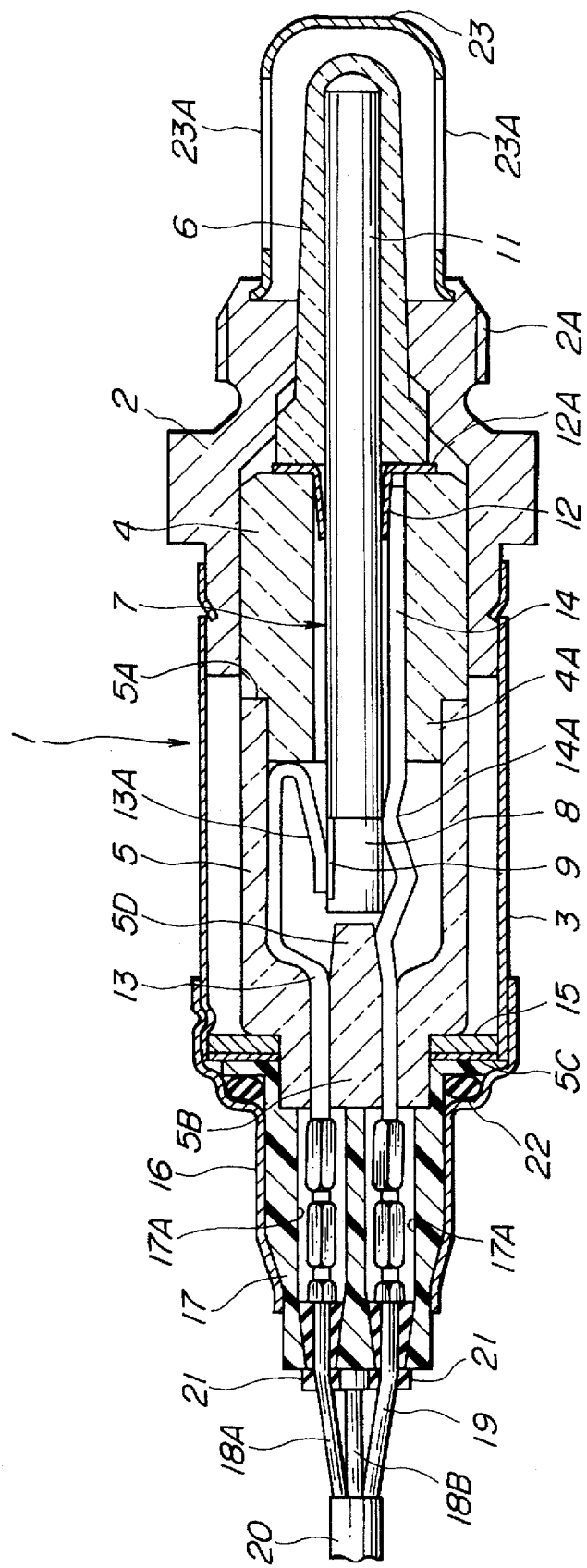
FIG. 1 is a sectional view of an oxygen sensor equipped with a ceramic heater which is produced by the method of a first embodiment of the present invention.

Referring to FIGS. 1 to 4, particularly FIG. 1, there is shown an oxygen sensor 1 in which a ceramic heater produced by the method of the present invention is installed.

As shown in FIG. 1, the oxygen sensor 1 comprises a stepped cylindrical holder 2 which has at its right end an externally threaded portion 2A. The holder 2 has at its left end a cylindrical cap 3 coaxially connected thereto. The holder 2 and the cap 3 are constructed of a metal, such as stainless steel or the like. Although not shown in the drawings, the threaded portion 2A of the holder 2 is tightly engaged with a threaded bore formed in an exhaust tube, so that a tubular probe 6 is exposed the interior of the exhaust tube in an after-mentioned manner. The exposed part of the probe 6 is housed in a tubular protector 23 which is formed with a plurality of openings 23A. The tubular protector 23 is secured at its base portion to the holder 2.

Designated by numeral 4 is a cylindrical center member constructed of an electrically insulating material such as a ceramic or the like, which has a right major portion tightly put in the holder 2 and a stepped left end portion 4A connected with a cylindrical insulating cover 5.

As shown, the cylindrical insulating cover 5 and the cylindrical insulating center member 4 are coaxially connected. That is, the cylindrical insulating cover 5 has an open right end 5A tightly received on an annular recess defined by the stepped left end portion 4A of the center member 4. Similar to the center member 4, the insulating cover 5 is constructed of a ceramic or the like. The insulating cover 5 has a closed left end 5B which is directed toward a left end portion of the cylindrical cap 3. The closed left end 5B is formed with a stepped outer portion 5C on which a disc spring 15 is disposed in an after-mentioned manner. The closed left end 5B is formed with a center projection 5D which projects rightward, that is, toward a left end of a ceramic heater 7 which will be described in detail hereinafter.

The tubular probe 6 is tightly and coaxially held by the holder 2 through a washer. The tubular probe 6 has a right half portion projected from the holder 2 as shown. The tubular probe 6 is constructed of zirconium oxide. Although not shown in the drawing, the inner and outer surfaces of the tubular probe 6 are respectively equipped with inner and outer electrodes. The inner electrode abuts on a conductive collar 12 in an after-mentioned manner for accomplishing electric connection therebetween, and the outer electrode is connected through the above-mentioned washer to the holder 2 for electric connection therebetween. When exposed to the exhaust gas flowing in an exhaust tube of the engine, the tubular probe 6 generates an electromotive force in accordance with the difference in oxygen o concentration between the exhaust gas and the surrounding air. Thus, the electromotive force can be used as an information signal representing the oxygen concentration in the exhaust gas.

As shown, the ceramic heater 7 is an elongate cylindrical member, which is held by the conductive collar 12 and has a right-half portion tightly received in the tubular probe 6 and a left-half portion spacedly received in the center member 4.

Figure 2:
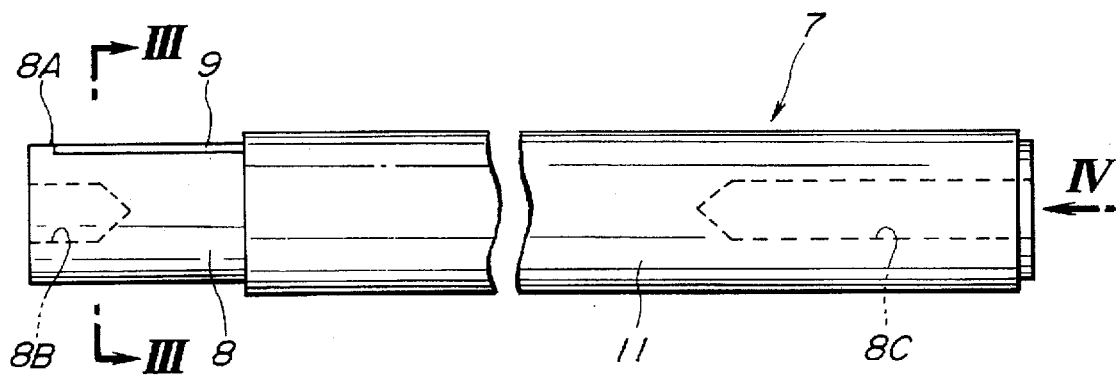
FIG. 2 is an enlarged sectional view of an essential portion of the ceramic heater used in the oxygen sensor of FIG. 1.

As is understood from FIG. 2, the ceramic heater 7 comprises an elongate cylindrical heater core 8 constructed of a ceramic material, such as alumina or the like. As is seen from FIGS. 2 and 3, the heater core 8 has on its left cylindrical outer surface two flat portions 8A and 8A each being equipped with a terminal portion 9. As may be seen from FIGS. 5C and 6, the heater core 8 has a heater pattern 10 printed on the cylindrical outer surface thereof, which pattern extends from the terminal portions 9 to a leading end (viz., the right end when viewed in FIG. 2) of the heater core 8. As will be described in detail hereinafter, the printing is carried out by rotating the heater core 8 about its axis. The printed heater core 8 is covered with a protection layer 11 which protects the heater pattern 10.

The heater core 8 is molded, via injection molding, from a ceramic material, such as alumina or the like. In the disclosed heater core 8, the outer diameter is about 3.8 mm, the length is about 57 mm, the axial length of each flat portion 8A is about 6 mm and the width of the same is about 1.5 mm. The two flat portions 8A and 8A are spaced by about 120 degrees in angle.

The elongate heater core 8 is formed at its both ends with respective bores 8B and 8C which extend toward each other as shown in FIG. 2. Each bore 8B or 8C has a square cross section. The left bore 8B has the length of about 3 mm and the right bore 8C has the length of about 15 mm. Production of these bores 8B and 8C can reduce the thermal capacity of the heater core 8.

Figure 7:
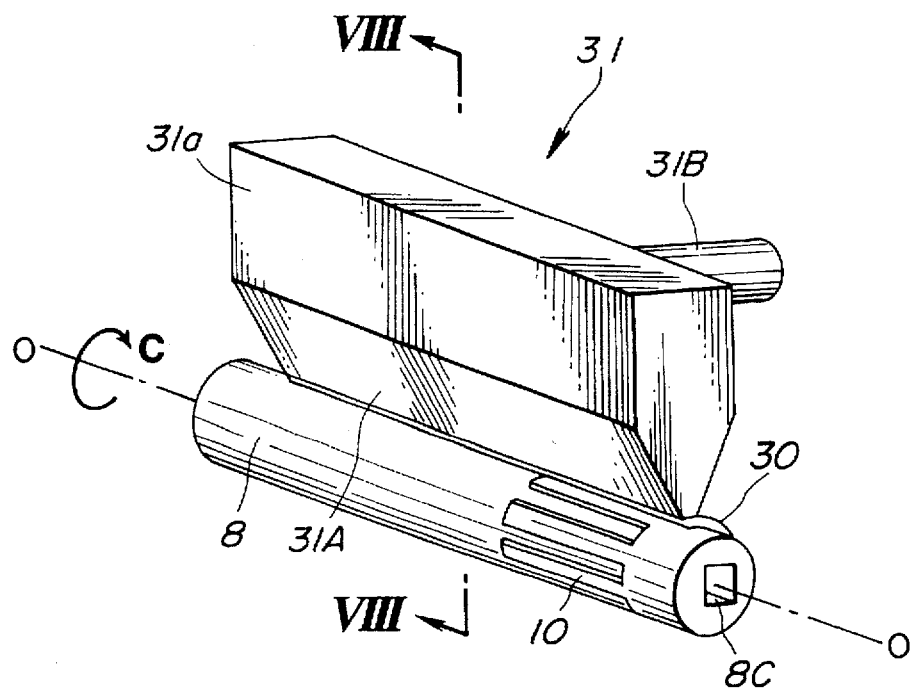
FIG. 7 is a perspective view of a coater for coating on an outer surface of the heater core a green protection layer.

As will be understood from FIG. 7, the bores 8B and 8C are arranged on the longitudinal axis "O—O" of the heater core 8, about which the heater core 8 is turned when the same is applied with an after-mentioned alumina paste 30. More specifically, two coaxially arranged square bars (not shown) are mated with the bores 8B and 8C for allowing a free rotation of the heater core 8 about the axis.

Referring back to FIG. 3, each terminal portion 9 is provided by plating a conductive material, such as, gold, silver, copper, nickel or the like, on an end portion 10A of the heater pattern 10 which portion has been printed on the flat portion 8A. When electrically energized, the heater pattern 10 is heated to about 500° C. to 700° C. together with the heater core 8.

As is understood from FIGS. 1 and 2, the leading (or right) end portion of the heater core 8 is inserted into the tubular probe 6, so that upon energization of the heater pattern 10, the tubular probe 6 can be heated to the level of about 350° C. at which the probe 6 can exhibit its normal performance.

Referring back to FIG. 1, the conductive collar 12 functions not only to hold the ceramic heater 7 but also to transmit the detected signal from the probe 6 to the outside. As shown, the conductive collar 12 is somewhat tapered and has an annular flange 12A. Due to the tapered construction of the collar 12, the ceramic heater 7 is positioned in a radial direction in the insulating center member 4. The annular flange 12A of the conductive collar 12 is intimately put between the right end of the center member 4 and the base (or left) end of the tubular probe 6 and connected to the inner electrode of the probe 6. An elongate contact plate 14 extends from the conductive collar 12 to the outside in an after-mentioned manner.

Designated by numeral 13 is one of elongate contact springs which are installed in the insulating cover 5, each having a portion which extends through the closed left end 5B of the cover 5 to the outside. That is, the two contact springs 13 and the contact plate 14 are equally spaced and arranged to surround the center portion 5D of the cover 5. The contact springs 13 have generally U-shaped bent back portions 13A which resiliently abut against the respective terminal portions 9 of the ceramic heater 7. That is, energization of the ceramic heater 7 is effected by an electric current which flows through the two contact springs 13.

As shown in FIG. 1, the elongate contact plate 14 has a bent middle portion 14A which resiliently abuts against the left end portion of the ceramic heater 7. Due to the biasing forces produced by the two U-shaped bent back portions 13A of the contact springs 13 and the bent middle portion 14A of the elongate contact plate 14, the left end portion of the ceramic heater 7 is positioned in a radial direction.

A cylindrical tail member 17 of an insulating material is connected to the left end of the cylindrical insulating cover 5. Preferably, the tail member 17 is constructed of a fluorine-contained resin, such as polytetrafluoroethylene or the like. The cylindrical tail member 17 is formed at its right end portion with a circular recess into which the stepped outer portion 5C of the cover 5 is inserted leaving a certain annular clearance therebetween. Inserted into the clearance are an annular wall formed on the left end of the cylindrical cap 3 and the above-mentioned disc spring 15. Due to the work of the disc spring 15, the insulating cover 5 and thus the center member 4 are biased rightward thereby tightly pressing the annular flange 12A of the conductive collar 12 against the inner electrode of the tubular probe 6. Furthermore, due to disc spring 15, the insulating cover 5, the center member 4 and the tubular probe 6 are positioned in the assembly of the oxygen sensor 1.

Designated by numeral 16 is an outer cap which covers the cylindrical tail member 17. The outer cap 16 has an enlarged right end secured to the left end of the cap 3 through caulking. An O-ring 22 disposed about the right end of the tail member 17 is received in the enlarged right end of the outer cap 16.

The cylindrical tail member 17 is formed with three passages 17A in which the left end portions of the two elongate contact springs 13 and the left end portion of the elongate contact plate 14 are connected with respective lead wires 18A, and 19 by means of connectors (no numerals) or caulking.

The three lead wires 18A, 18B and 19 extend to the outside of the tail member 17 through respective seals 21 snugly set in the passages 17A. The three lead wires 18A, 18B and 19 from the tail member 17 are put together to constitute a wire harness 20.

When in use, the oxygen sensor 1 is mounted to an exhaust tube of an internal combustion engine in such a manner that the tubular probe 6 (more specifically, the tubular protector 23) is projected into the interior of the exhaust tube. During operation, the oxygen sensor 1, more specifically, the tubular probe 6 is heated by the ceramic heater 7 which is energized by an electric power applied thereto through the lead wires 18A and 18B. The electromotive force, viz., oxygen concentration representing signal, generated by the tubular probe 6 is led to a known signal processing unit (not shown) through the lead wire 19 and the vehicle body.

In the following, a method of producing the ceramic heater 7 will be described with reference to FIGS. 5A to 5F and FIGS. 6 to 8, which method is a first embodiment of the present invention. For ease of understanding, a member or structure which is in a green condition will be designated by the corresponding reference numeral which is bracketed.

First, a ceramic powder, such as an alumina power or the like, is mixed and heated with an organic binder. After being cooled, the mixture is treated to produce pellets of the mixture.

Figure 5A:
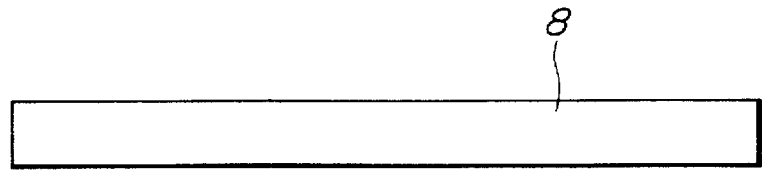
FIGS. 5A to 5F are drawings showing the steps for producing the ceramic heater of FIG. 2.

The pellets are fed to an injection-molding machine (not shown) and heated to fluidize the organic binder. With this, the pellets are formed into a fluidized ceramic material. The fluidized ceramic material is injected into a mold (not shown). With this, a cylindrical green heater core (8) is produced, which is shown in FIG. 5A. The green heater core (8) has, for example, the diameter of about 3.8 mm and the length of about 57 mm. The green heater core has two flat portions (8A) and (8A) at one end, which correspond to the flat portions 8A and 8A shown in FIGS. 2 and 3. That is, the axial length of each flat portion (8A) is about 6 mm and the width of the same is about 1.5 mm. These flat portions (8A) and (8A) are spaced by about 120 degrees in angle. Furthermore, the green heater core (8) is formed at its both ends with square bores (8B) and (8C) which correspond to the bores 8B and 8C shown in FIG. 2. One bore (8B) has the length of about 3 mm and the other bore (8C) has the length of about 15 mm. Of course, the size of each bore (8B or 8C) may be varied in accordance with the user's need. Usage of the injection molding technique facilitates molding of the green heater core (8) having the above-mentioned construction.

Figure 5B:
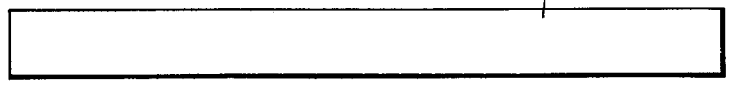

Then, as is seen from FIG. 5B, the green heater core (8) is subjected to a provisional baking process. In this process, after removing part of the binder by being put into a degreasing oven (not shown), the green heater core (8) is put into a heating furnace (not shown) and provisionally baked, in an atmosphere of surrounding air, at a temperature from about 800° C. to about 400° C., preferably at a temperature from about 1000° C. to about 1200° C. With this provisional baking, the green heater core (8) becomes to have a certain hardness sufficient for a subsequent printing process. The organic binder left in the heater core 8 is pyrolyzed and the cracked gas thus produced is removed from the heater core 8. Thus, the organic binder is almost removed from the heater core 8. The heater core 8 is then left in the atmosphere for a certain time to be slowly cooled. Due to this gentle cooling, the heater core 8 reduces its size by about 1% to 2%.

Figure 5C:
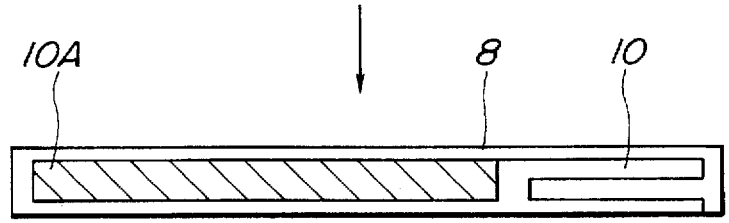
Figure 6:
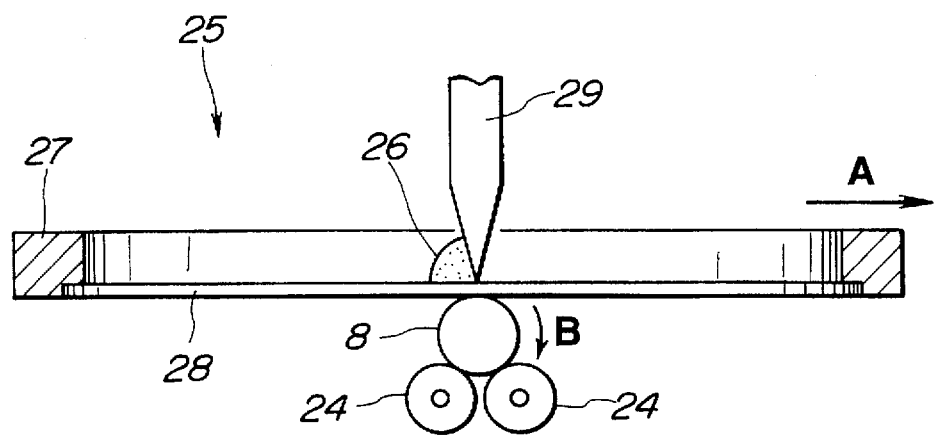
FIG. 6 is a schematic illustration showing a step for printing a heater pattern on an outer surface of the heater core.

Then, as is seen from FIG. 5C, the hardened heater core 8 is subjected to a printing process. In this process, a printer 25 as schematically shown in FIG. 6 is used. The screen printer 25 generally comprises a rectangular frame 27 movable in the direction of the arrow "A", a mesh-mask 28 held by the frame 27, a squeegee 29 having a lower edge slidable on the mesh-mask 28. The mesh-mask 28 has a pattern which corresponds to the heater pattern 10 printed on the heater core 8. A pair of parallel rollers 24 and 24 are arranged below the mesh-mask 28.

In printing, the heater core 8 is put on the rollers 24 and 24 and rotatably held by the square bars (not shown) engaged with the bores 8B and 8C. The mesh-mask 28 is arranged above the heater core 8 and a given amount of solder paste 26 is supplied onto the mesh-mask 28. The solder paste 26 includes a conductive material, such as tungsten (W), which generates marked heat when electrically energized. The lower edge of the squeegee 29 is then brought into contact with the mesh-mask 28 in a manner to press the mesh-mask 28 against the heater core 8 with a given force. Then, the frame 27 is moved in the direction of the arrow "A". With this movement, the heater core 8 is rotated on the rollers 24 in the direction of the arrow "B" and the heater pattern (10) is printed on the cylindrical outer surface of the heater core 8 with the solder paste 26. As is understood from FIG. 2, the heater pattern (10) printed on the heater core 8 has end portions (10A) and (10A) which are placed on the flat portions 8A and 8A of the heater core 8. Because the printing is carried out on the rotating heater core 8, the printed heater pattern (10) can have an even thickness therethroughout.

Figure 5D:
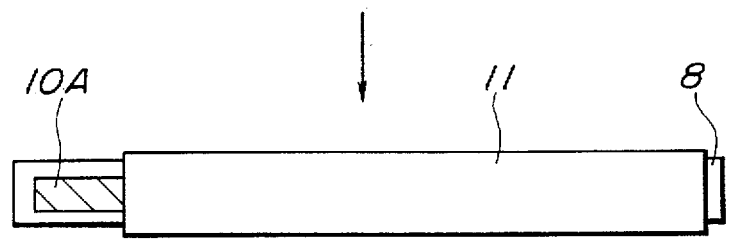
Figure 5E:
Figure 8:
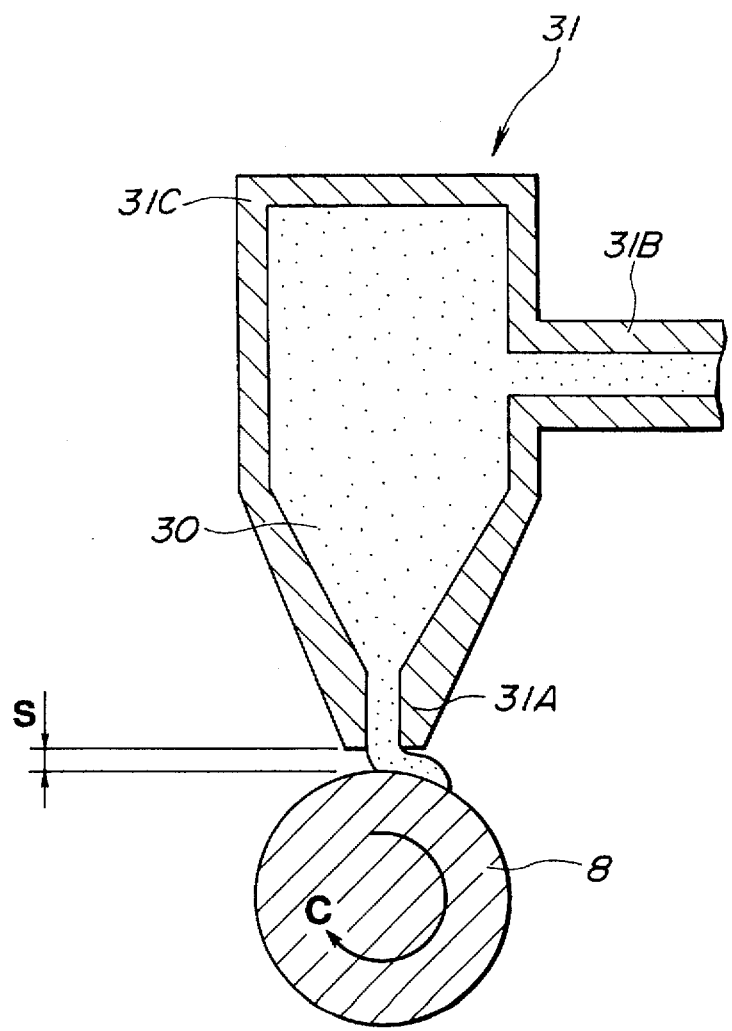
FIG. 8 is an enlarged sectional view of the coater, which is taken along the line VIII—VIII of FIG. 7.

Then, as is seen from FIG. 5D, the printed heater core 8 is subjected to a protection layer coating process. In this process, a coater 31 as shown in FIGS. 7 and 8 is used. The coater 31 comprises a container 31C having a flat nozzle 31A and a paste feeding tube 31B connected to an upper portion of the container 31C. An alumina paste 30 having the viscosity higher than about 100 Pa.s (Pascal Second) is supplied to the container 31C through the paste feeding tube 31B. The alumina paste 30 comprises an alumina powder, an organic binder (such as ethylcellulose resin or the like) and a solvent.

In coating, the printed heater core 8 is rotatably held by the square bars (not shown) engaged with the bores 8B and 8C. The coater 31 is arranged above the printed heater core 8 in such a manner that the flat nozzle 31A thereof extends along the longitudinal axis "O—O" of the elongate heater core 8. As is seen from FIG. 8, the flat nozzle 31A is spaced from the cylindrical outer surface of the green heater core 8 by "S" which is about 400 μm to about 500 μm. By driving the square bars, the heater core 8 is rotated about the axis "O—O" in the direction of the arrow "C" at a lower speed. Preferably, the rotation speed is about one turn per second. With this rotation, the cylindrical outer surface of the printed heater core 8 is coated with a layer (11) of the alumina paste 30. The thickness of the layer (11) is about 400 μm to about 500 μm. By adjusting the amount of the alumina paste 30 fed from the flat nozzle 31A as well as the rotation speed of the heater core 8, the paste coating can be finished with one rotation of the heater core 8. The heater core 8 thus applied with the green protection layer (11) is then left in a drying furnace for several hours for drying the layer (11).

Figure 5F:
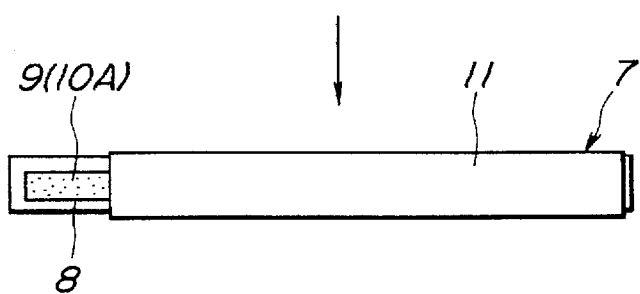

Then, as is seen from FIG. 5F, the coated heater core 8 is subjected to a baking process. In this process, the heater core 8 is put into a baking furnace and baked for about 2 hours in an atmosphere of reducing gas (that is, argon gas with hydrogen gas, nitrogen gas with hydrogen gas, etc.,) at a temperature from about 1400° C. to 1700° C., preferably at a temperature from about 1500° C. to about 1650° C. With this baking process, not only the layer (11) of alumina paste 30 but also the printed heater pattern 10 is sufficiently baked and thus solidified. Furthermore, the heater core 8 is fully baked. by this baking process, the thickness of the protection layer 11 is reduced to about 200 μm. Due to usage of the reducing atmosphere, the heater pattern 10 is prevented from oxidizing during the baking process.

Then, as is seen from FIG. 5F, the fully baked heater core 8 is subjected to a metal plating process. In this process, a conductive material, such as, gold, silver, copper, nickel or the like, is plated on the end portions 10A of the heater pattern 10. With this, the terminal portions 9 and 9 of the heater pattern 10 are formed.

Figure 3:
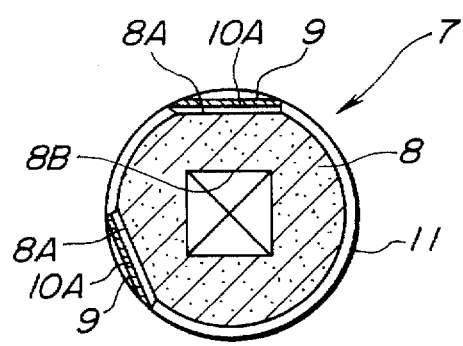
FIG. 3 is an enlarged sectional view taken along the line III—III of FIG. 2.
Figure 4:
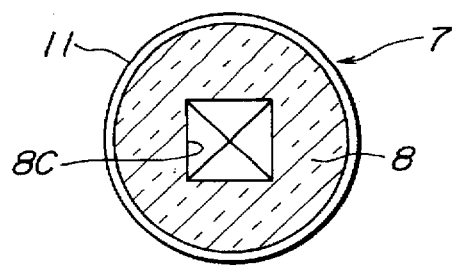
FIG. 4 is an enlarged side view taken from the direction of the arrow "V" of FIG. 2.

With the above-stated, steps, the ceramic heater 7 as shown in FIGS. 2, 3 and 4 is produced. The ceramic heater 7 thus produced is installed in the oxygen sensor 1 (see FIG. 1) in the afore-mentioned manner.

In the following, advantages of the first embodiment of the invention will be described.

Due to employment of the provisional baking process of FIG. 5B, the organic binder left in the heater core 8 is pyrolized. The cracked gas thus produced is easily removed from the heater core 8 to the outside. Thus, the organic binder can be almost removed from the heater core 8 at this provisional basing process. Thus, undesired pin hole phenomenon does not occur at the real baking process. In the afore-mentioned conventional method, the cracked gas generated at the real baking process causes formation of the undesired pin holes in the protection layer. Due to the protection layer 11, the heater pattern 10 can be protected and thus can have a longer life.

When, in general, baking of ceramic is carried out in a reducing atmosphere, the thermal decomposition of the binder tends to take place at a higher temperature and thus interferes with the baking. Thus, a binder having a sufficient thermal decomposition characteristic at a lower temperature is needed, which is however expensive. However, in the present invention, employment of the provisional baking process brings about no use of such expensive binder.

Due to employment of the screen printing process of FIGS. 5C and 6, the heater pattern 10 can be easily and precisely printed on the outer surface of the heater core 8.

Due to usage of the coater 31 of FIGS. 7 and 8, the protective layer 11 can be easily applied to the heater core 8. In fact, such coater 31 is suitable for applying a cylindrical surface with a paste-layer having an even thickness therethroughout.

Because the terminal portions 9 of the heater pattern 10 are formed flat, the contact (see FIG. 1) between the terminal portions 9 and the U-shaped bent back portions 13A of the contact springs 13 is stably or assuredly made.

Because the heater core 8 is formed with the bores 8B and 8C, the thermal capacity of the heater core 8 is reduced, which can speed up heating thereof and thus that of the tubular probe 6 of the oxygen sensor 1 upon energization of the heater pattern 10.

Due to usage of the coater 31 as shown in FIGS. 7 and 8, the coating of the paste 30 onto the heater core 8 can be finished with only one rotation of the heater core 8, which shortens the paste coating time as compared with the above-mentioned third conventional method.

Referring to FIGS. 9A to 9E, there is shown another method of producing a ceramic heater, which is a second embodiment of the present invention.

Figure 9A:
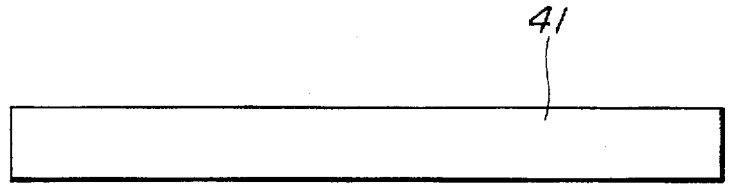
FIGS. 9A to 9E are drawings similar to FIGS. 5A to 5F, but showing the method of a second embodiment of the present invention.

First, a rod-like green member is molded, via extrusion molding, from a ceramic material such as alumina or the like, and the rod-like green member is cut into elongate pieces 41 of a predetermined length. Each piece 41 is then dried to such a degree as to have a hardness sufficient for a subsequent printing process. The piece 41 dried is a hardened heater core 41 as shown in FIG. 9A.

Figure 9B:
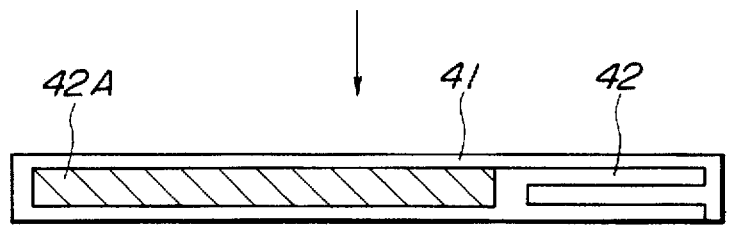

Then, as is seen from FIG. 9B, the hardened heater core 41 is subjected to a printing process. In this process, a heater pattern (42) is printed on the cylindrical outer surface of the heater core 41 in substantially the same manner as the printing process (see FIGS. 5C and 6) of the above-mentioned first embodiment. The heater pattern (42) printed on the heater core 41 has end portions (42A) and (42A) which correspond to the end portions (42A) and (10A) of the first embodiment.

Figure 9C:
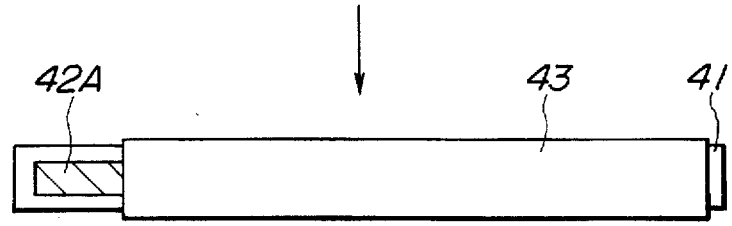

Then, as is seen from FIG. 9C, the printed heater core 41 is subjected to a protection layer coating process which is substantially the same as the protecting layer coating process (see FIG. 5D) of the first embodiment.

Figure 9D:
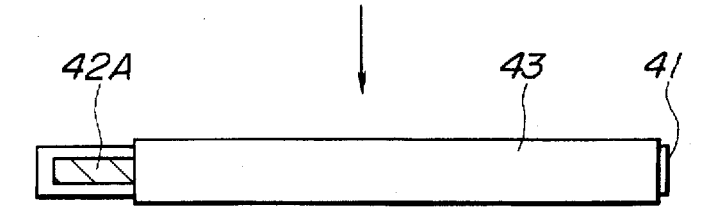

Then, as is seen from FIG. 9D, the coated heater core 41 is subjected to a baking process which is substantially the same as the baking process (see FIG. 5E) of the first embodiment.

Figure 9E:
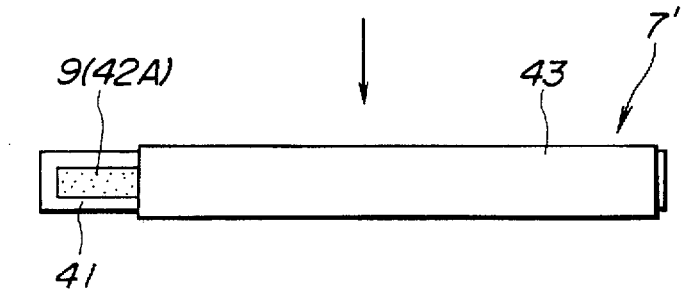

Then, as is seen from FIG. 9E, the fully baked heater core 41 is subjected to a metal plating process which is substantially the same as the metal plating process (see FIG. 5F) of the first embodiment. With this, the terminal portions 9 and 9 of the heater pattern 42 are formed.

With the above-stated steps of the second embodiment, a ceramic heater 7' (see FIG. 9E) is produced, which is substantially the same as the ceramic heater 7 produced by the method of the first embodiment.

Advantages possessed by this second embodiment are substantially the same as those of the first embodiment.

In the following, modifications of the present invention will be described.

A through bore may be formed in the heater core 8 or 41 in place of the bores 8B and 8C. In this modification, the thermal capacity of the heater core can be much reduced and thus, the heating of the tubular probe 6 of the oxygen sensor 1 can be much sped up.

If desired, as the material of the heater pattern 10 or 42, platinum (Pt) and Molybdenum (Mo) may be used. When using platinum (Pt), the baking can be carried out in the atmosphere.

If desired, for forming the terminal portions 9 and 9 of the heater pattern 10 or 42, a vapour deposition technique may be used. While, if the heater pattern 10 or 42 is constructed of platinum (Pt), naked end portions of the heater pattern can be used as the terminal portions. That is, in this case, the metal plating process is not necessary.

What is claimed is:

1. A method of producing a ceramic heater, comprising the steps of:
   (a) molding a green cylindrical object from a ceramic material which contains a binder;
   (b) baking said green cylindrical object at a relatively low temperature thereby to produce a baked cylindrical object, said relatively low temperature being a temperature ranging from approximately 800° C. to approximately 1400° C., which is sufficient for removing the binder from the cylindrical object;
   (c) printing a heater pattern on a cylindrical surface of said baked cylindrical object, said heater pattern being constructed of an electrically conductive material;
   (d) coating the printed cylindrical surface of said baked cylindrical object with a green protection layer thereby to produce a layer-coated cylindrical object; and
   (e) baking said layer-coated cylindrical object at a relatively high temperature sufficient for fully baking said baked cylindrical object, said heat pattern and said green protection layer, said high temperature being a temperature ranging from approximately 1400° C. to approximately 1700° C.

2. A method as claimed in claim 1, in which the baking of the step is carried out in an atmosphere of air.

3. A method as claimed in claim 2, in which the protection layer coated on the baked cylindrical object at the step (d) has a single layer.

4. A method as claimed in claim 2, in which the green cylindrical object provide at the step (a) is produced via injection molding.

5. A method as claimed in claim 2, in which the green cylindrical object provided at the step (a) is produced via extrusion molding.

6. A method as claimed in claim 2, wherein before carrying out the step (b), said green cylindrical object is put into a degreasing oven for removing part of said binder from the object.

7. A method as claimed in claim 1, in which said relatively low temperature of the step (b) ranges from approximately 1000° C. to approximately 1200° C., and in which said relatively high temperature of the step (e) ranges from approximately 1500° C. to approximately 1650° C.

8. A method as claimed in claim 2, in which the heater pattern printing is carried out by rotating said baked cylindrical object about its axis.

9. A method as claimed in claim 2, in which the green protection layer coated on said baked cylindrical object at the step (d) has a thickness ranging from approximately 400 μm to 500 μm.

10. A method as claimed in claim 9, in which said green protection layer has a viscosity higher than approximately 100 Pa.s.

11. A method as claimed in claim 7, in which the baking at the step (e) is carried out for about 2 hours in an atmosphere of reducing gas.

\* \* \* \* \*